(12) United States Patent
Tsai

(10) Patent No.: US 8,582,213 B2
(45) Date of Patent: Nov. 12, 2013

(54) ZOOM LENS STRUCTURE AND CAMERA LENS

(75) Inventor: Yi-Yuan Tsai, Changhua County (TW)

(73) Assignee: Altek Corporation, Hsinchu (TW)

( * ) Notice: Subject to any disclaimer, the term of this patent is extended or adjusted under 35 U.S.C. 154(b) by 160 days.

(21) Appl. No.: 13/370,894

(22) Filed: Feb. 10, 2012

(65) Prior Publication Data

US 2013/0135753 A1    May 30, 2013

(30) Foreign Application Priority Data

Nov. 29, 2011   (TW) .............................. 100143819 A

(51) Int. Cl.
*G02B 15/14* (2006.01)
(52) U.S. Cl.
USPC .......................................................... 359/701
(58) Field of Classification Search
USPC .......................................................... 359/701
See application file for complete search history.

(56) References Cited

U.S. PATENT DOCUMENTS

2010/0296176 A1* 11/2010 Shinano et al. ............... 359/700

* cited by examiner

*Primary Examiner* — James Jones
(74) *Attorney, Agent, or Firm* — Muncy, Geissler, Olds & Lowe, PLLC

(57) ABSTRACT

This invention discloses a zoom lens structure and a camera lens. The zoom lens structure comprises a shifting barrel, a zoom-driving ring, a fixed barrel and a focus-driving ring. The shifting barrel has a first guiding protrusion. The zoom-driving ring is arranged at a periphery of the shifting barrel, and having a groove-hole and a first-driving part. The fixed barrel is arranged at a periphery of the zoom-driving ring, and having a first groove. The first guiding protrusion is passed through the groove-hole and inserted into the first groove. The focus-driving ring is coupled to an end of the zoom-driving ring and having a second-driving part at the outer edge thereof. By a driving module driving the first-driving part and the second-driving part at the same time, the zoom-driving ring and the focus-driving ring are rotated forwardly or reversely for zooming or focusing.

14 Claims, 6 Drawing Sheets

ZOOM LENS STRUCTURE AND CAMERA LENS

CROSS-REFERENCE TO RELATED APPLICATION

This application claims the benefit of Taiwan Patent Application No. 100143819, filed on Nov. 29, 2011, in the Taiwan Intellectual Property Office, the disclosure of which is incorporated herein in its entirety by reference.

BACKGROUND OF THE INVENTION

1. Field of the Invention

The present invention relates to a zoom lens structure, in particular to the zoom lens capable of performing zooming and focusing operation by using a same driving module.

2. Description of the Related Art

In general, digital still cameras available in the market usually have zooming function and focusing function, and most cameras adopt two motors for driving and controlling the zooming and focusing operations respectively, and the cameras also require two sets of control circuits for computing and driving the motors, and thus incurring a higher cost, requiring a small component installation of space for the product design, and undoubtedly creating a major obstacle to use two motors for driving and controlling the zooming and focusing operations in the camera.

To improve the aforementioned problems, some cameras adopt a specially-shaped groove formed at an internal periphery of a lens barrel, so that a zoom lens can be fixed after the lens is situated at a specific position and a zooming operation is completed, so that the zoom lens can be moved to achieve the zooming effect. However, the design of the specially shaped groove includes both zooming and focusing functions, and the level of zooming is limited by the limited angle of rotation, and most designs of the specially shaped groove can provide a 3-stage zooming operation only.

In view of the description above, the inventor of the present invention designed a zoom lens structure and a camera lens to overcome the drawbacks of the prior art and to improve the industrial applications.

SUMMARY OF THE INVENTION

In view of the aforementioned problems of the prior art, it is a primary objective of the present invention to provide a zoom lens structure and a camera lens to overcome the technical problems of the conventional image pickup device requiring two motors to drive the components for the zooming and focusing operations and incurring a higher cost or adopting a specially shaped groove that limits the level of zooming.

To achieve the aforementioned objective, the present invention provides a zoom lens structure comprising a shifting barrel, a zoom-driving ring, a fixed barrel and a focus-driving ring. The shifting barrel is a hollow cylindrical structure having a first guiding protrusion formed on an external wall of the shifting barrel. The zoom-driving ring is a hollow cylindrical structure sheathed on a periphery of the shifting barrel. The zoom-driving ring has a groove-hole and a first driving part disposed on an external wall of the zoom-driving ring. The fixed barrel is a hollow cylindrical structure sheathed on a periphery of the zoom-driving ring and has a first groove formed on an internal wall of the fixed barrel, and the first guiding protrusion is passed through the groove-hole and inserted into the first groove. The focus-driving ring is a hollow cylindrical structure coupled to an end of the zoom-driving ring and has a second driving part disposed on an external wall of the focus-driving ring, and a driving module is inserted into the first driving part and the second driving part simultaneously to rotate the zoom-driving ring and the focus-driving ring clockwise or counterclockwise for zooming or focusing.

In an embodiment, a side of the groove-hole abuts the first guiding protrusion to move the first guiding protrusion along the first groove when the driving module drives the zoom-driving ring to rotate, so as to drive the shifting barrel to move.

In an embodiment, the groove-hole has a predetermined width, such that the first guiding protrusion is moved relatively in the groove-hole without touching a sidewall of the groove-hole when the driving module drives the zoom-driving ring and the focus-driving ring to rotate.

In an embodiment, the first guiding protrusion is moved in the groove-hole without touching a sidewall of the groove-hole when the driving module drives the focus-driving ring to perform a focusing.

In an embodiment, the zoom lens structure may further comprise a focus supporting frame disposed in the focus-driving ring, and a second guiding protrusion formed at the focus supporting frame, wherein the focus-driving ring has a second groove formed at an internal periphery of the focus-driving ring, and the second guiding protrusion is inserted into the second groove, so that the focus supporting frame moves in accordance with the second groove.

In an embodiment, the second groove may be an oblique groove, and the second guiding protrusion is moved obliquely along the second groove.

In an embodiment, the groove-hole is a linear groove, and the first groove is an oblique groove or a combination of a linear groove and an oblique groove, and the first guiding protrusion is moved vertically or obliquely along the first groove.

To achieve the aforementioned objective, the present invention further provides a camera lens comprising a focus lens structure, a zoom-driving ring, a fixed barrel, a focus-driving ring, a zoom lens group and a focus lens group. Wherein, the zoom lens structure comprises a shifting barrel, a zoom-driving ring, a fixed barrel and a focus-driving ring. The shifting barrel is a hollow cylindrical structure and has a first guiding protrusion formed on an external wall of the shifting barrel. The zoom-driving ring is a hollow cylindrical structure sheathed on a periphery of the shifting barrel and has a groove-hole and a first driving part disposed on an external wall of the zoom-driving ring. The fixed barrel is a hollow cylindrical structure sheathed on a periphery of the zoom-driving ring and has a first groove formed on an inner wall of the fixed barrel, and the first guiding protrusion is passed through the groove-hole and inserted into the first groove. The focus-driving ring is a hollow cylindrical structure coupled to an end of the zoom-driving ring and has a second groove formed at a periphery of the focus-driving ring, and a second driving part is disposed at an external periphery of the focus-driving ring, and a driving module is inserted into the first driving part and the second driving part simultaneously to rotate the zoom-driving ring and the focus-driving ring clockwise or counterclockwise for zooming or focusing. The zoom lens group has a first lens group and a second lens group, the first lens group is disposed in the shifting barrel and the second lens group is disposed in the zoom-driving ring. The focus lens group is disposed in the focus-driving ring and has a focus supporting frame, and the focus supporting frame has a second guiding protrusion inserted into the second groove.

In an embodiment, a side of the groove-hole is provided for abutting the first guiding protrusion to move the first guiding protrusion along the first groove when the driving module drives the zoom-driving ring to rotate clockwise, so as to drive the shifting barrel to move, and the first lens group move relatively to the second lens group.

In an embodiment, the groove-hole has a predetermined width that allows the first guiding protrusion to move relatively in the groove-hole along the driving module without touching a sidewall of the groove-hole when the driving module drives the zoom-driving ring and the focus-driving ring in accordance with the predetermined with to rotate counterclockwise.

In an embodiment, when the driving module drives he focus-driving ring for focusing, the first guiding protrusion is moved in the groove-hole without touching the sidewall of the groove-hole.

In an embodiment, the second guiding protrusion follows the second groove to move when the focus-driving ring is rotated, and the zooming lens group move relatively to the focus lens group.

In summation of the description above, the zoom lens structure and the camera lens in accordance with the present invention have one or more of the following advantages:

(1) The zoom lens structure and the camera lens can use a driving module for zooming and focusing to reduce the number of components and the space required for installation of components, so as to lower the cost and enhance the product competitiveness.

(2) The zoom lens structure and the camera lens can use the groove-hole to increase the level of zooming while maintaining the focusing function, since the position of the zoom lens structure is not limited to a specific position after the zooming takes place.

DESCRIPTION OF THE PREFERRED EMBODIMENTS

The technical characteristics of the present invention will become apparent with the detailed description of the preferred embodiments accompanied with the illustration of related drawings as follows. It is noteworthy to point out that the drawings are provided for the purpose of illustrating the present invention, but they are not necessarily drawn according to the actual scale, or are intended for limiting the scope of the invention.

The zoom lens structure of the present invention can use a single driving module (such as a motor) for zooming and focusing, and thus the zoom lens structure can be applied in a digital camera, a smart mobile phone which has photograph function, a SLR-Like(Single-Lens-Reflex-Like) or a replaceable lens camera. Of course, the application of the invention is not limited to such image pickup devices only.

Figure 1:
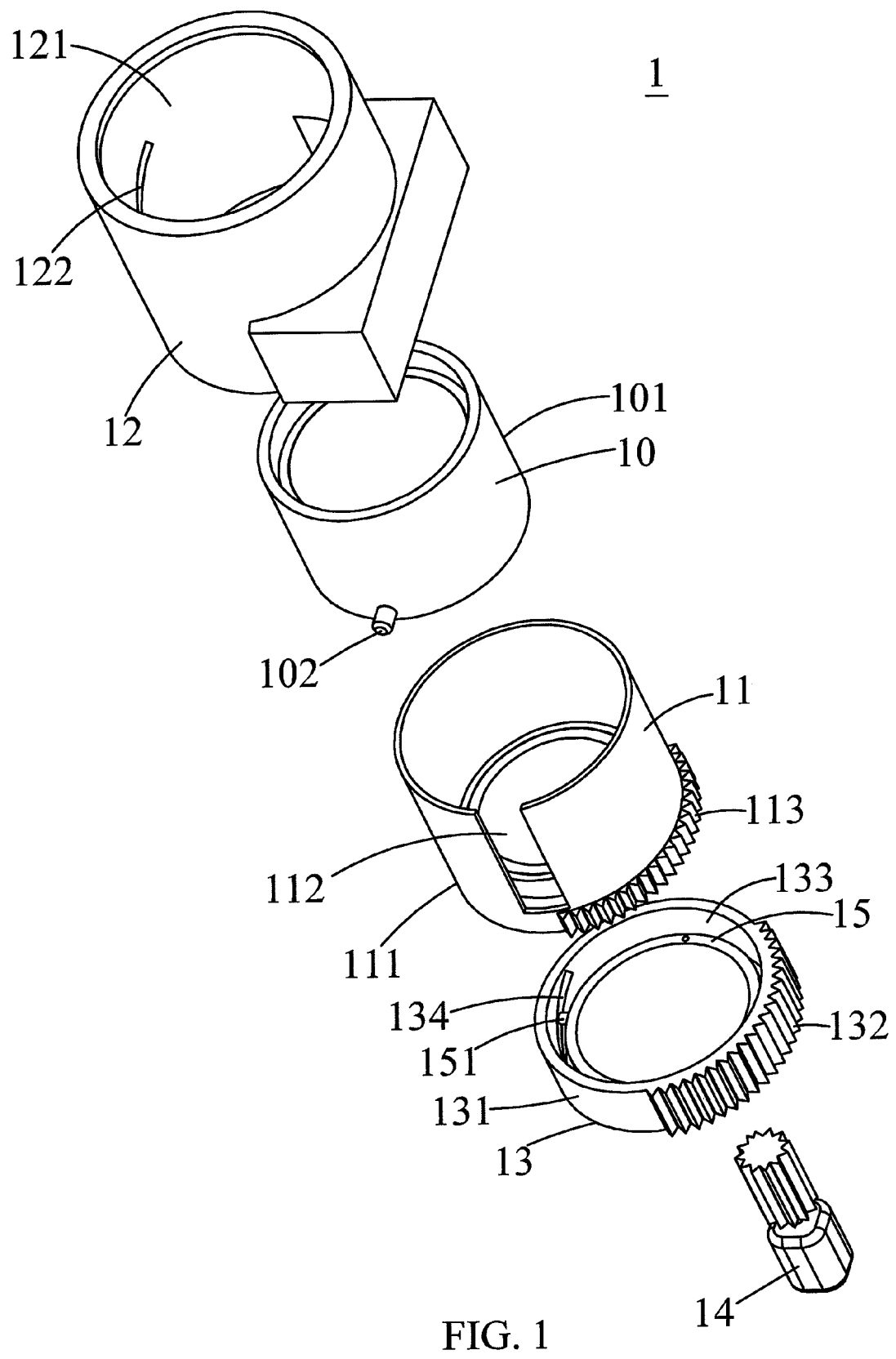
FIG. 1 is an exploded view of a zoom lens structure of the present invention.
Figure 2:
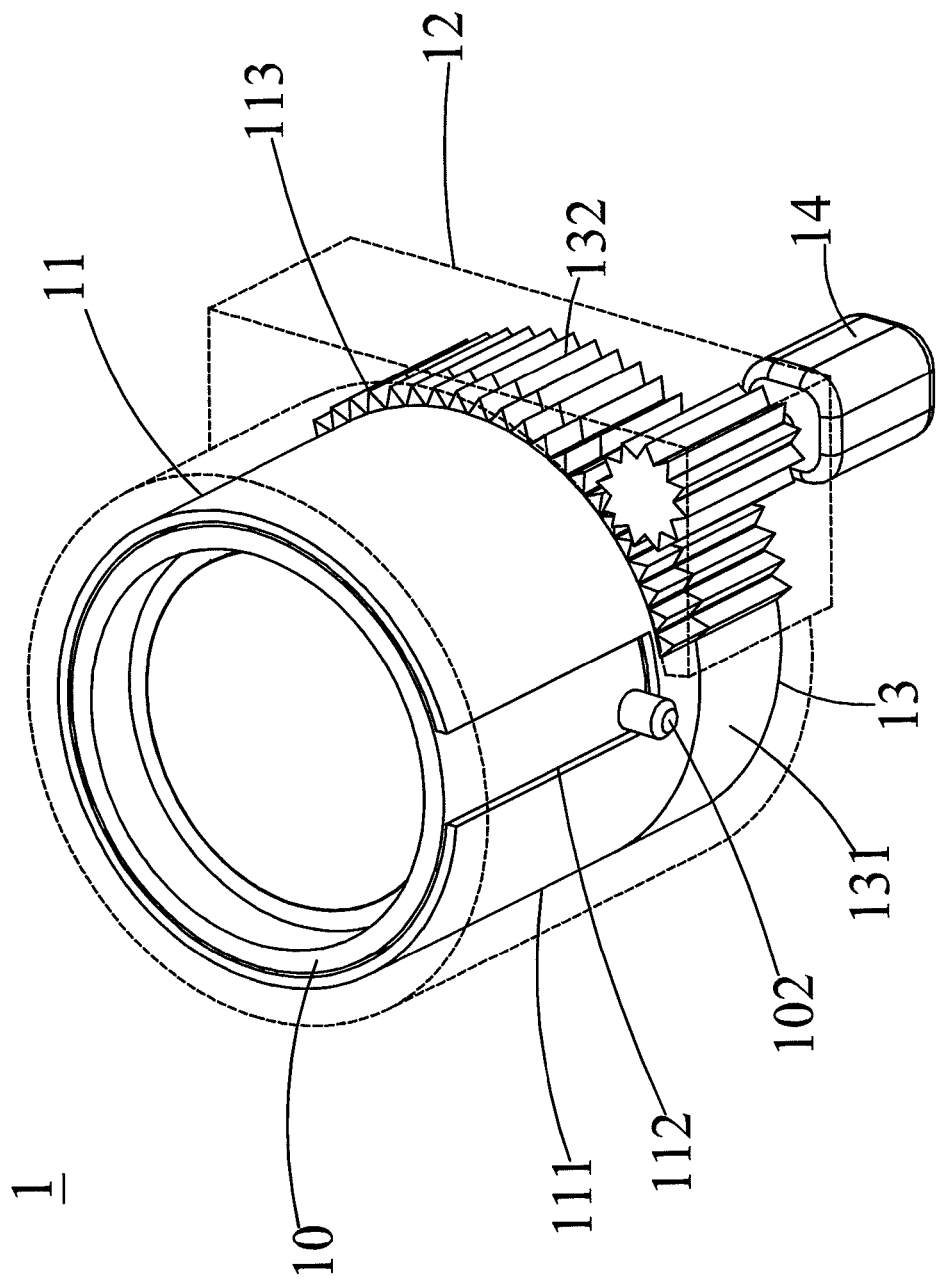
FIG. 2 is a perspective view of a zoom lens structure of the present invention.

With reference to FIGS. 1 and 2 for an exploded view and a perspective view of a zoom lens structure in accordance with the present invention respectively, the zoom lens structure 1 comprises a shifting barrel 10, a zoom-driving ring 11, a fixed barrel 12 and a focus-driving ring 13. Wherein, the shifting barrel 10 is a hollow cylindrical structure, and the shifting barrel 10 has a first guiding protrusion 102 formed on an external wall 101 of the shifting barrel 10. The zoom-driving ring 11 which is sheathed on a periphery of the shifting barrel 10 is a hollow cylindrical structure. The zoom-driving ring 11 has a groove-hole 112 and a first driving part 113 disposed on an external wall 111 of the zoom-driving ring 11, wherein the groove-hole 112 can be a linear groove. The fixed barrel 12 which is sheathed on a periphery of the zoom-driving ring 11 is a hollow cylindrical structure, and has a first groove 122 formed on an internal wall 121 of the fixed barrel 12. The first guiding protrusion 102 passes through the groove-hole 112 and inserted into the first groove 122. The focus-driving ring 13 which is coupled to an end of the zoom-driving ring 11 is a hollow cylindrical structure, and has a second driving part 132 disposed on an external wall 131 of the focus-driving ring 13. The focus-driving ring 13 is inserted into the first driving part 113 and the second driving part 132 at the same time to rotate the zoom-driving ring 11 and the focus-driving ring 13 clockwise or counterclockwise for zooming or focusing by a driving module 14. Wherein, the driving module 14 can be a direct current motor or a stepper motor, and controls the operation of the motor to drive the zoom-driving ring 11 and the focus-driving ring 13 to rotate clockwise or counterclockwise for zooming or focusing by a control unit (not shown in the figure).

In abovementioned description, a side of the groove-hole 112 of the zoom-driving ring 11 abuts the first guiding protrusion 102 of the shifting barrel 10 when the driving module 14 drives the zoom-driving ring 11 and the focus-driving ring 13 to rotate clockwise. Since the first guiding protrusion 102 is inserted into the first groove 122 of the fixed barrel 12, therefore the first guiding protrusion 102 can be moved along the first groove 122 to drive the shifting barrel 10 to move for zooming. After the zooming operation is finished, the driving module 14 drives the zoom-driving ring 11 and the focus-driving ring 13 to rotate in a counterclockwise direction. Since the groove-hole 112 of the zoom-driving ring 11 has a predetermined width, therefore the first guiding protrusion 102 will can not touch the sidewall of the groove-hole 112 when the first guiding protrusion 102 is moved relatively in the groove-hole 112 to maintain the zoomed status, and the focus-driving ring 13 can further perform a zooming operation. More specifically, the position of the first guiding protrusion 102 of the shifting barrel 10 remains unchanged during the focusing operation, and only the zoom-driving ring 11 and focus-driving ring 13 are rotated and moved, and the first guiding protrusion 102 will can not touch the sidewall of the groove-hole 112.

In addition, the zoom lens structure 1 may further comprise a focus supporting frame 15 disposed in the focus-driving ring 13, so that an optical lens group can be disposed on the focus supporting frame 15 for the focusing effect. The zoom supporting frame 15 includes a second guiding protrusion 151, wherein a second groove 134 is formed on an inner wall 133 of the focus-driving ring 13, and the second guiding protrusion 151 is inserted into the second groove 134, so that the zoom supporting frame 15 can be guided by the shape of the second groove 134 to move.

Figure 3:
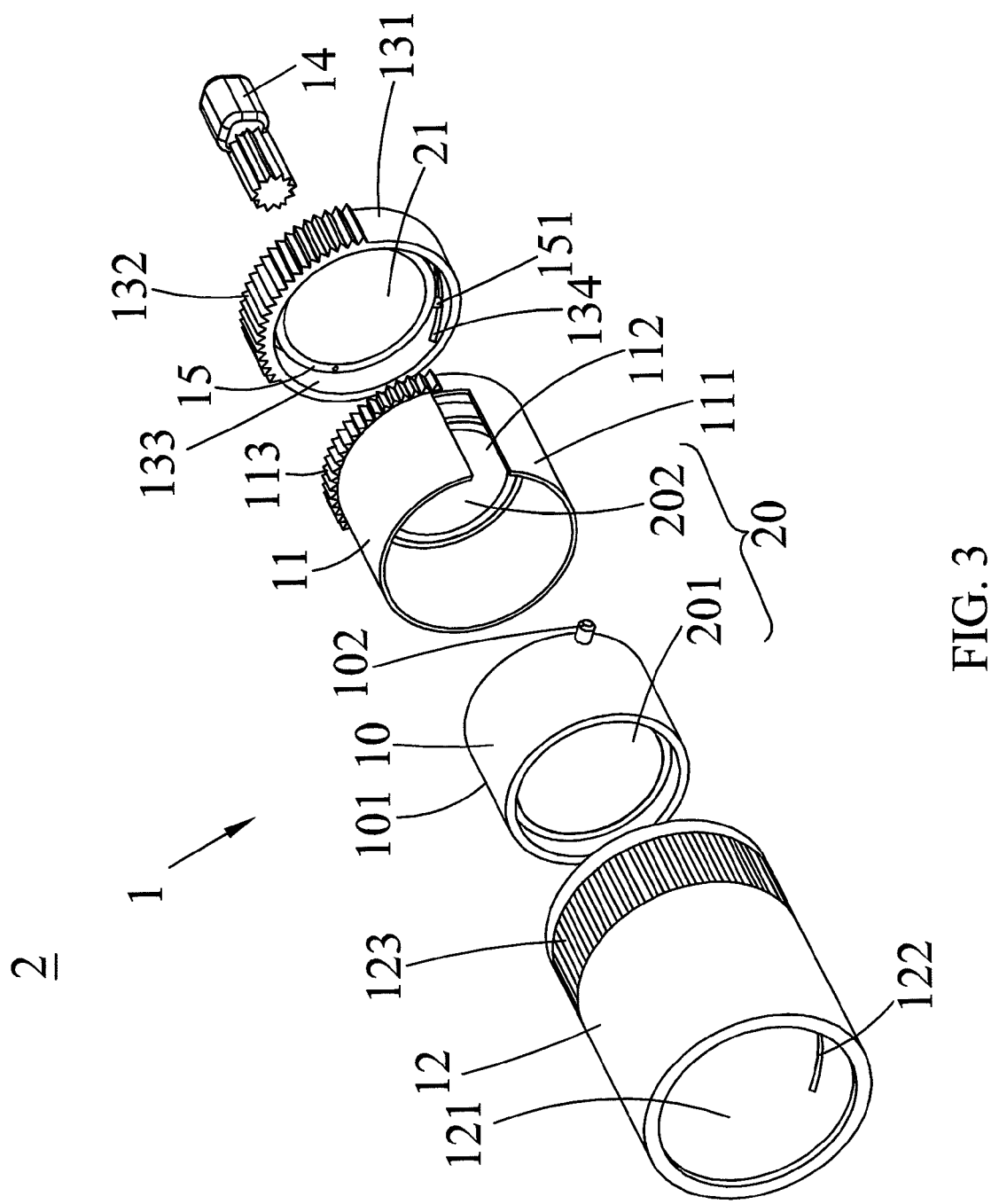
FIG. 3 is a first schematic view of a zoom lens structure in accordance with a first preferred embodiment of the present invention.
Figure 4:
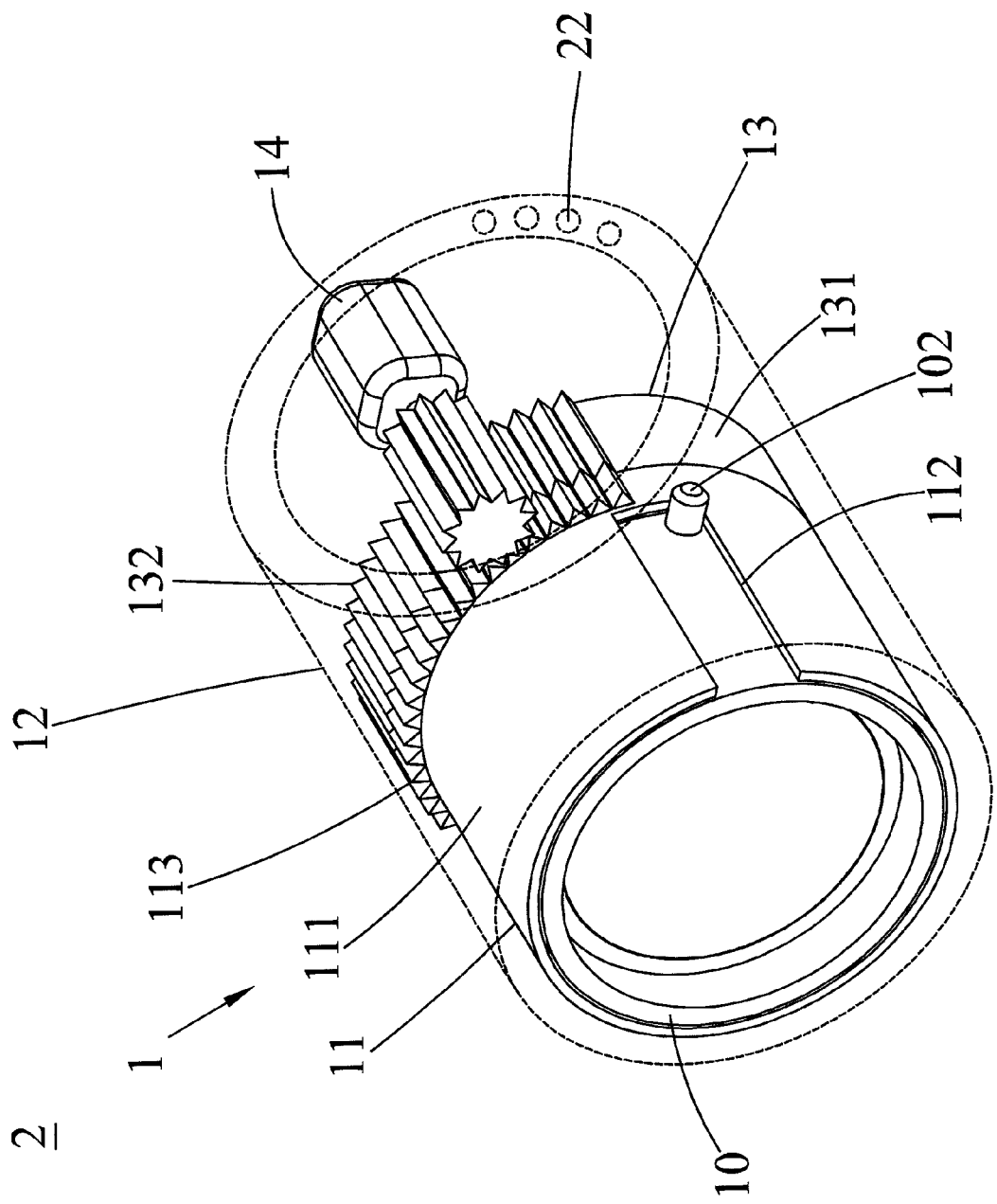
FIG. 4 is a second schematic view of a zoom lens structure in accordance with the first preferred embodiment of the present invention.

With reference to FIGS. 3 and 4 for first and second schematic views of a zoom lens structure in accordance with the first preferred embodiment of the present invention respectively, the zoom lens structure 1 can be applicable for a camera lens 2. The connection and operation of the zoom lens structure 1 of this preferred embodiment are the same as the abovementioned description, and thus they will not be described again. The camera lens 2 can be a replaceable camera lens 2. The camera lens 2 comprises a zoom lens group 20, a focus lens group 21 and a plurality of control contacts 22. Wherein, the zoom lens group 20 has a first lens group 201 and a second lens group 212, the first lens group 201 is disposed in the shifting barrel 10, the second lens group 202 is disposed in the zoom-driving ring 11. As to the actual design requirements, one of the first lens group 201 and the second lens group 202 (such as the second lens group 202) is fixed, and the other lens group (such as the first lens group 201) can be moved with the shifting barrel 10. A side of the groove-hole 112 of the zoom-driving ring 11 abuts the first guiding protrusion 102 of the shifting barrel 10 when the driving module 14 drives the zoom-driving ring 11 and the focus-driving ring 13 to rotate clockwise, and the first guiding protrusion 102 is inserted into the first groove 122 of the fixed barrel 12, so that the first guiding protrusion 102 can moved along the first groove 122 to drive the shifting barrel 10 to move, and the two lens groups can be moved relatively to change the distance between the first lens group 201 and the second lens group 202, so as to adjust the focal length of the camera lens 2 and the distance of forming an image. Wherein, the first groove 122 can be a linear groove coupled to an oblique groove and then coupled to a linear groove or an oblique groove. When the first guiding protrusion 102 is moved along the oblique groove of the first groove 122, the shifting barrel 10 is moved axially. Preferably, the fixed barrel 12 can include a manual ring 123. A third driving part (not shown in the figure), which is corresponded to the first driving part 113 and the second driving part 132, is disposed on an inner wall of the manual ring 123. The third driving part is inserted into the first driving part 113 and the second driving part 132 at the same time, so that a user can manually rotate the manual ring 123 clockwise for zooming, and then rotate the manual ring 123 counterclockwise to complete the focusing.

The focus lens group 21 is disposed in the focus-driving ring 13 and on the focus supporting frame 15. The focus supporting frame 15 has a second guiding protrusion 151, and the second guiding protrusion 151 is inserted into the second groove 134. The zoom-driving ring 11 and the focus-driving ring 13 are rotated for focusing when the driving module 14 drives the zoom-driving ring 11 and the focus-driving ring 13 to rotate counterclockwise, and the first guiding protrusion 102 will can not touch the sidewall of the groove-hole 112 because of the groove-hole 112 has a predetermined width in the zoom-driving ring 11, and the zoomed status can be maintained. The second guiding protrusion 151 of the focus supporting frame 15 of the focus-driving ring 13 is moved along the shape of the second groove 134, so that the zoom lens group 20 and the focus lens group 21 can be moved relatively to change the distance between the two lens groups, so as to change the focus point of the image. In practical application, the second groove 134 can be an oblique groove. If the second guiding protrusion 151 is moved obliquely along the second groove 134, the focus lens group 21 can be driven to move axially.

Wherein, the control contacts 22 are electrically coupled to the driving module 14 for receiving a control instruction from the replaceable lens camera, so that the driving module 14 drives the zoom-driving ring 11 and the focus-driving ring 13 to rotate clockwise or counterclockwise. Wherein, the driving module 14 can be embedded into the first driving part 113 of the zoom-driving ring 11 and the second driving part 132 of the focus-driving ring 13 through a gear set. For example, the first driving part 113 and the second driving part 132 have inwardly concave gear marks or outwardly convex gear marks for embedding the driving module 14 to drive the zoom-driving ring 11 and the focus-driving ring 13 to rotate clockwise or counterclockwise.

Figure 5:
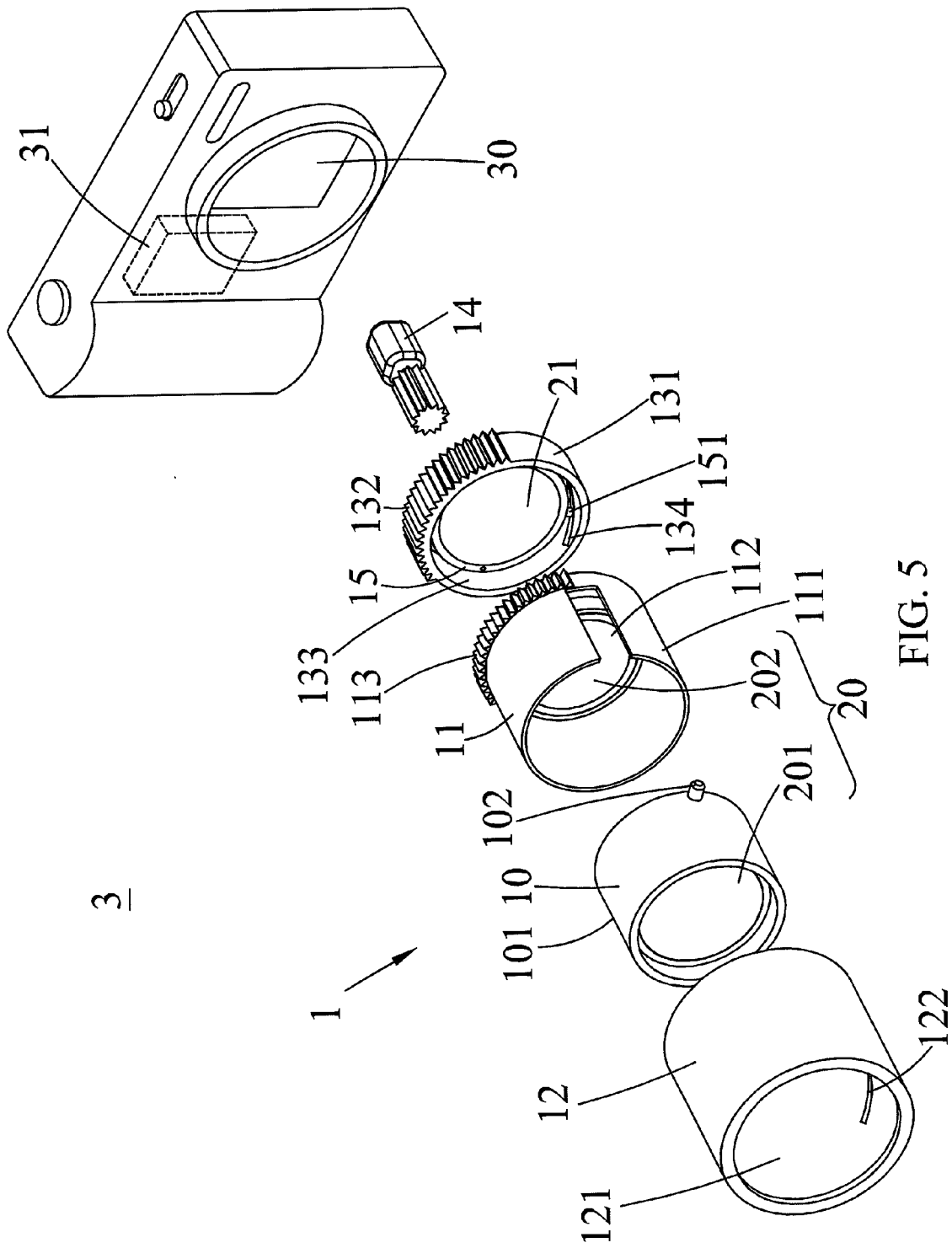
FIG. 5 is a first schematic view of a zoom lens structure in accordance with a second preferred embodiment of the present invention.
Figure 6:
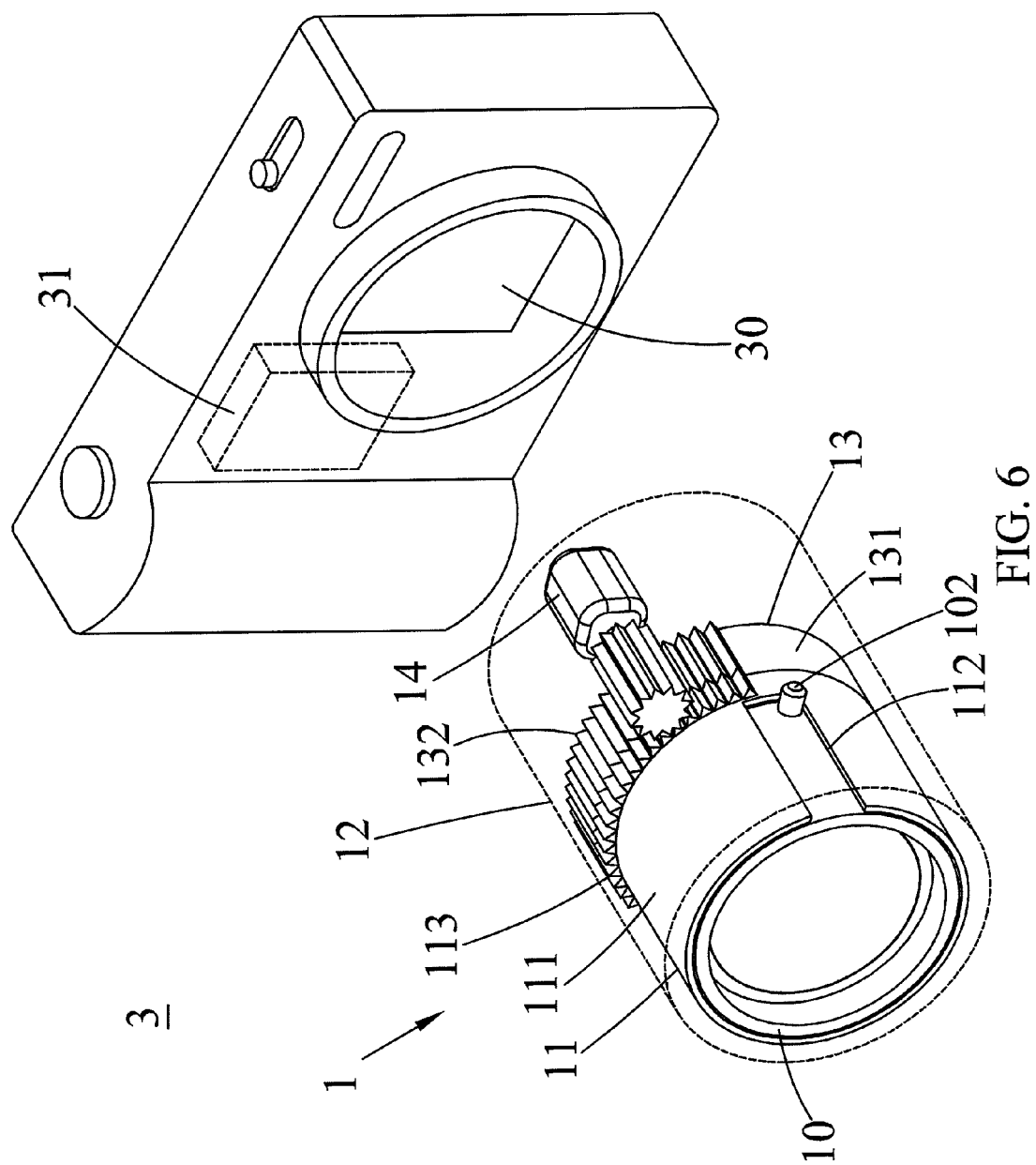
FIG. 6 is a second schematic view of a zoom lens structure in accordance with the second preferred embodiment of the present invention.

With reference to FIGS. 5 and 6 for a first schematic view and a second schematic view of zoom lens structure in accordance with the second preferred embodiment of the present invention respectively. The zoom lens structure is applicable for a camera 3. The connection and operation of the zoom lens structure 1 of this preferred embodiment are the same as the first preferred embodiment, and thus they will not be described again. The camera 3 comprises a zoom lens group 20, a focus lens group 21, an image sensor 30 and a control unit 31. The image sensor 30 can be a charge coupled device (CCD) or a complementary metal oxide semiconductor (CMOS) sensor for sensing the light of an image of an object to be photographed to form an imaging. The control unit 31 can be a microprocessor control unit, a central processing unit (CPU) or a micro-processing unit. The control unit 31 is electrically coupled to the driving module 14. If the control unit 31 controls the driving module 14 to drive the zooming-driving ring 11 and the focus-driving ring 13 to rotate clockwise, a side of the groove-hole 112 of the zooming-driving ring 11 abuts the first guiding protrusion 102 of the shifting barrel 10 to move in the first groove 122 and move the shifting barrel 10 to change the distance between the first lens group 201 and the second lens group 202 of the zooming lens group 20, so as to achieve the zooming effect. The control unit 31 controls the driving module 14 to drive the zoom-driving ring 11 and the focus-driving ring 13 to rotate counterclockwise, the groove-hole 112 of the zoom-driving ring 11 has a predetermined width, such that the first guiding protrusion 102 will not be abutted by the other side of the groove-hole 112 (or the first guiding protrusion 102 will can not touch the sidewall of the groove-hole 112) to maintain the position of the first guiding protrusion 102, and the focus supporting frame 15 of the focus-driving ring 13 is moved along the second groove 134, so that the zoom lens group 20 and the focus lens group 21 can be moved relatively to change the distance between the two lens groups to complete the focusing operation, and the image sensor 30 can receive an appropriate light of an image of the object to be photographed to form the imaging.

It is noteworthy to point out that the quantity of the first guiding protrusions 102 and their corresponding first grooves 122 or the quantity of the second guiding protrusions 151 and their corresponding second grooves 134 can be changed according to actual requirements. To achieve a stable movement, the quantity can be designed to be two or three sets, and the protrusions moved in the groove can provide a uniform force to achieve a more accurate zooming or focusing effect.

In summation of the description above, the zoom lens structure and the camera lens can use a driving module to drive the zoom-driving ring and the focus-driving ring to rotate clockwise or counterclockwise to complete the zooming and focusing operations, so as to reduce the number of components of the product. As to the required components of a camera lens, a driving module (such as the motor) is generally one of the high-priced components, so that the reduced quantity of the driving modules can lower the production cost significantly. In addition, the driving module also occupies much installation space of the camera lens, so that the reduced quantity of the driving modules is favorable to a compact design of the camera lens or facilitates designers to design the camera lens. Since the groove-hole of the zoom-driving ring has a predetermined width, therefore the first guiding protrusion can be moved in the groove-hole without touching the sidewall of the groove-hole when the zoom-driving ring and the focus-driving ring are rotated, and the zoomed lens is not limited to the specific position of the first groove of the fixed barrel only. While maintaining the focusing function of the lens, the zoom lens can be designed more flexibly, so as to improve the level of the zoom lens.

While the invention has been described by means of specific embodiments, numerous modifications and variations could be made thereto by those skilled in the art without departing from the scope and spirit of the invention set forth in the claims.

What is claimed is:

1. A zoom lens structure, comprising:
a shifting barrel, being a hollow cylindrical structure, and having a first guiding protrusion formed on an external wall of the shifting barrel;
a zoom-driving ring, being a hollow cylindrical structure, sheathed on a periphery of the shifting barrel, and having a groove-hole and a first driving part disposed on an external wall of the zoom-driving ring;
a fixed barrel, being a hollow cylindrical structure, sheathed on a periphery of the zoom-driving ring, and having a first groove formed on an internal wall of the fixed barrel, and the first guiding protrusion passing through the groove-hole and being inserted into the first groove; and
a focus-driving ring, being a hollow cylindrical structure, coupled to an end of the zoom-driving ring, and having a second driving part disposed on an external wall of the focus-driving ring, and inserting into the first driving part and the second driving part simultaneously by a driving module to rotate the zoom-driving ring and the focus-driving ring clockwise or counterclockwise for zooming or focusing.

2. The zoom lens structure of claim 1, wherein a side of the groove-hole abuts the first guiding protrusion to move the first guiding protrusion along the first groove when the driving module drives the zoom-driving ring to rotate, so as to drive the shifting barrel to move.

3. The zoom lens structure of claim 1, wherein the groove-hole has a predetermined width, such that the first guiding protrusion is moved relatively in the groove-hole without touching a sidewall of the groove-hole when the driving module drives the zoom-driving ring and the focus-driving ring to rotate.

4. The zoom lens structure of claim 3, wherein the first guiding protrusion is moved in the groove-hole without touching a sidewall of the groove-hole when the driving module drives the focus-driving ring to perform a focusing.

5. The zoom lens structure of claim 1, further comprising a focus supporting frame disposed in the focus-driving ring, and a second guiding protrusion formed at the focus supporting frame, wherein the focus-driving ring has a second groove formed at an internal periphery of the focus-driving ring, and the second guiding protrusion is inserted into the second groove, so that the focus supporting frame moves in accordance with the second groove.

6. The zoom lens structure of claim 5, wherein the second groove is an oblique groove, and the second guiding protrusion is moved obliquely along the second groove.

7. The zoom lens structure of claim 1, wherein the groove-hole is a linear groove, and the first groove is an oblique groove or a combination of a linear groove and an oblique groove, and the first guiding protrusion is moved vertically or obliquely along the first groove.

8. A camera lens, comprising:
a zoom lens structure, comprising:
a shifting barrel, being a hollow cylindrical structure, and having a first guiding protrusion formed on an external wall of the shifting barrel;
a zoom-driving ring, being a hollow cylindrical structure, sheathed on a periphery of the shifting barrel, and having a groove-hole and a first driving part disposed on an external wall of the zoom-driving ring;
a fixed barrel, being a hollow cylindrical structure, sheathed on a periphery of the zoom-driving ring, and having a first groove formed on an inner wall of the fixed barrel, and the first guiding protrusion passing through the groove-hole and being inserted into the first groove; and
a focus-driving ring, being a hollow cylindrical structure, coupled to an end of the zoom-driving ring, and having a second groove formed at a periphery of the focus-driving ring, and having a second driving part disposed on an external periphery of the focus-driving ring, and inserting into the first driving part and the second driving part simultaneously by a driving module to rotate the zoom-driving ring and the focus-driving ring clockwise or counterclockwise for zooming or focusing;
a zoom lens group, having a first lens group and a second lens group, the first lens group disposed in the shifting barrel, and the second lens group disposed in the zoom-driving ring; and
a focus lens group, disposed in the focus-driving ring, and having a focus supporting frame, and the zoom supporting frame having a second guiding protrusion inserted into the second groove.

9. The camera lens of claim 8, wherein a side of the groove-hole is provided for abutting the first guiding protrusion to move the first guiding protrusion along the first groove when the driving module drives the zoom-driving ring to rotate clockwise, so as to drive the shifting barrel to move, and the first lens group move relatively to the second lens group.

10. The camera lens of claim 8, wherein the groove-hole has a predetermined width that allows the first guiding protrusion to move relatively in the groove-hole along the driving module without touching a sidewall of the groove-hole when the driving module drives the zoom-driving ring and the focus-driving ring in accordance with the predetermined width to rotate counterclockwise.

11. The camera lens of claim 10, wherein when the driving module drives the focus-driving ring for focusing, the first guiding protrusion is moved in the groove-hole without touching the sidewall of the groove-hole.

12. The camera lens of claim 8, wherein the second guiding protrusion follows the second groove to move when the focus-driving ring is rotated, and the zoom lens group move relatively to the zoom lens group.

13. The camera lens of claim 8, wherein the second groove is an oblique groove, and the second guiding protrusion is moved obliquely along the second groove.

14. The camera lens of claim 8, wherein the groove-hole is a linear groove, and the first groove is an oblique groove or a combination of a linear groove and an oblique groove, and the first guiding protrusion is moved vertically or obliquely along the groove-hole.

* * * * *